(12) United States Patent
Garnett

(10) Patent No.: US 6,648,250 B2
(45) Date of Patent: Nov. 18, 2003

(54) SPREADING MACHINES FOR SPREADING ANIMAL BEDDING MATERIAL

(76) Inventor: Andrew Garnett, Clay Bank Farm, Allostock, Nr Knutsford, Cheshire WA16 9NE (GB)

(*) Notice: Subject to any disclaimer, the term of this patent is extended or adjusted under 35 U.S.C. 154(b) by 63 days.

(21) Appl. No.: 09/802,372

(22) Filed: Mar. 9, 2001

(65) Prior Publication Data

US 2002/0125348 A1 Sep. 12, 2002

(51) Int. Cl.[7] ............................................. A01C 17/00
(52) U.S. Cl. .................... 239/667; 239/658; 239/672; 239/673; 239/682; 239/687
(58) Field of Search ................... 239/658, 661, 239/667, 668, 671, 672, 673, 675, 681, 682, 687; 760/111, 901, 8

(56) References Cited

U.S. PATENT DOCUMENTS

| | | | | |
|---|---|---|---|---|
| 2,635,884 A | * | 4/1953 | Christiansen | |
| 2,755,092 A | * | 7/1956 | Donahoe | |
| 2,994,591 A | * | 8/1961 | Toto | |
| 4,381,080 A | * | 4/1983 | van der Lely et al. | 239/661 |
| 4,449,648 A | * | 5/1984 | Gustavsson | 239/661 |
| 4,709,861 A | * | 12/1987 | Henderson | 239/675 |
| 4,712,717 A | * | 12/1987 | Egerdahl | 239/661 |
| 4,836,456 A | * | 6/1989 | van der Lely | 239/682 |
| 4,864,748 A | * | 9/1989 | Boyer | 37/142.5 |
| 5,435,494 A | * | 7/1995 | Knight et al. | 239/675 |
| 5,957,394 A | * | 9/1999 | Becker | 239/673 |
| 5,976,011 A | * | 11/1999 | Hartman | 460/111 |

* cited by examiner

Primary Examiner—Michael Mar
Assistant Examiner—Dinh Q. Nguyen
(74) Attorney, Agent, or Firm—Ronald E. Smith; Smith & Hopen, P.A.

(57) ABSTRACT

A machine for spreading bedding material, comprises a hopper for receiving a bulk supply of the material. The hopper has sides, ends and a base, conveying means in the hopper for displacing the bulk supply in the hopper towards the ends, and discharge apertures in the base and located towards or at the ends, whereby material displaced by the conveying means falls through the discharge apertures, and including two distribution spinners which are adapted to be driven about upright axes and are located to receive the material which falls through the respective apertures, and to propel it horizontally away from the respective hopper ends onto the area to be layered.

12 Claims, 4 Drawing Sheets

SPREADING MACHINES FOR SPREADING ANIMAL BEDDING MATERIAL

FIELD OF INVENTION

This invention relates to spreading machines for animal bedding material. Such material is in the nature of loose stalks, chips, granules or particles. Examples of such materials, known as loose bedding materials, comprise straw, saw dust, wood chips, sand and the like and mixtures of these. These materials also provide a means of absorbing animal feces and urine, and in consequence are used extensively.

BACKGROUND OF THE INVENTION

To provide bedding for the animals, the bedding material must be spread over the area in which the animals will lie down to rest, and machines for this purpose have been developed. For example, in my European Patent Application No. 0826302, I have set forth a method of and a machine for spreading animal bedding material of the above type in cattle and like stalls. The machine specifically described comprises a conveyor which extends horizontally, and the animal bedding is fed to the conveyor from a hopper located above the conveyor. The conveyor is driven at high speed and in consequence, the bedding material can be flung from the end of the conveyor and is propelled to the far end of the stall, ensuring that the whole stall is layered with the bedding material.

That particular machine is however limited as to the area or location in which it can be used. It is specifically for cattle stalls, but there are often large open areas, known as loose yards, where animals rest, and it is advantageous for these areas also to be layered with the above bedding materials, and the present invention seeks to provide a machine of novel construction which can perform this task quickly and efficiently.

SUMMARY OF THE INVENTION

According to the invention there is provided a machine for spreading bedding material, comprising a hopper for receiving a bulk supply of the material, said hopper comprising sides, ends and a base, conveying means in the hopper for displacing the bulk supply in the hopper towards the ends, discharge apertures in the base and located towards or at the ends, whereby material displaced by the conveying means falls through the discharge apertures, and including two distribution spinners which are adapted to be driven and are located to receive the material which falls through the respective apertures, and to propel it away from the respective hopper ends onto the area to be layered.

The spinners are preferably arranged to rotate in opposite directions. The spinners may be driven at such a speed to cause the material to be propelled away from the machine to a distance in the region of 15 to 40 feet. The spinners can be of any form, and suitable examples of spinners are set forth in my co-pending UK patent application No. GB0009026.6.

The conveying means may be auger means, and in one example, there are two parallel augers in the hopper, the augers being respectively of right and left flights, the augers being driven in the same direction, so that one of the augers displaces the bulk material towards one end of the hopper and the other auger displaces the bulk material towards the other end of the hopper.

Other auger configurations may be adopted. Thus the two augers may be of the same hand, but may be driven in opposite directions, or the augers may from the central region have opposite handed flight sections from the center to the ends, so that the material is fed by each auger towards both ends of the hopper.

The means for driving the augers may be a hydraulic motor or hydraulic motors, and it is preferred that a hydraulic motor may be used for driving the spinners. In one example, a single hydraulic motor drives the spinners by way of V belt drives. Two pulleys on the spindle shaft of the motor are engaged by two V belts, and the belts are respectively drivingly connected to pulleys on the respective spinner shafts. Alternatively, the augers may be driven directly through a gearbox.

The spinners have suitable throwing vanes to propel the material over the areas to be layered. To treat a larger area, the machine is propelled over the large area to be treated, the material being spread as the machine progresses.

The machine may be self propelled, but preferably is adapted to be carried on a tractor or on the front of a loader. In any case, the hydraulic power for the motors is preferably provided by the prime mover of the machine or the tractor/loader, the motors being connected to the prime mover driven pump, by means of high pressure hoses. This provides the advantage that the hopper of the machine, on which the motors are mounted, can be adapted to be moved relative to the rest of the machine.

In one example of the machine the hopper may be mounted so as to be movable between a collecting position, in which the hopper is tilted and can be used as a loader bucket to pick up the bulk supply of the material (by pushing the hopper in this position into the bulk supply of the material). When the material has been picked up, the hopper can be tilted to an upright position ready for use.

The extent to which the material is thrown from the machine will be dependent upon the speed at which the augers and spinners are driven, but by using hydraulic motors, the speeds of these components can be varied considerably.

The apertures in the base are associated with closure/control plates which can be positioned selectively to close the apertures completely or to a required degree. These plates are movable either manually via a mechanical advantage device, or by a hydraulic ram or any other suitable means, and the plates may have holes therein, the hole sizes in effect being adjustable whereby the flow of the bedding material can be controlled, thus controlling the amount of material dispensed.

BRIEF DESCRIPTION OF THE DRAWINGS

An embodiment of the present invention will now be described, by way of example, with reference to the accompanying drawings, which are diagrammatic, and wherein.

DETAILED DESCRIPTION OF THE PREFERRED EMBODIMENT

Figure 1:
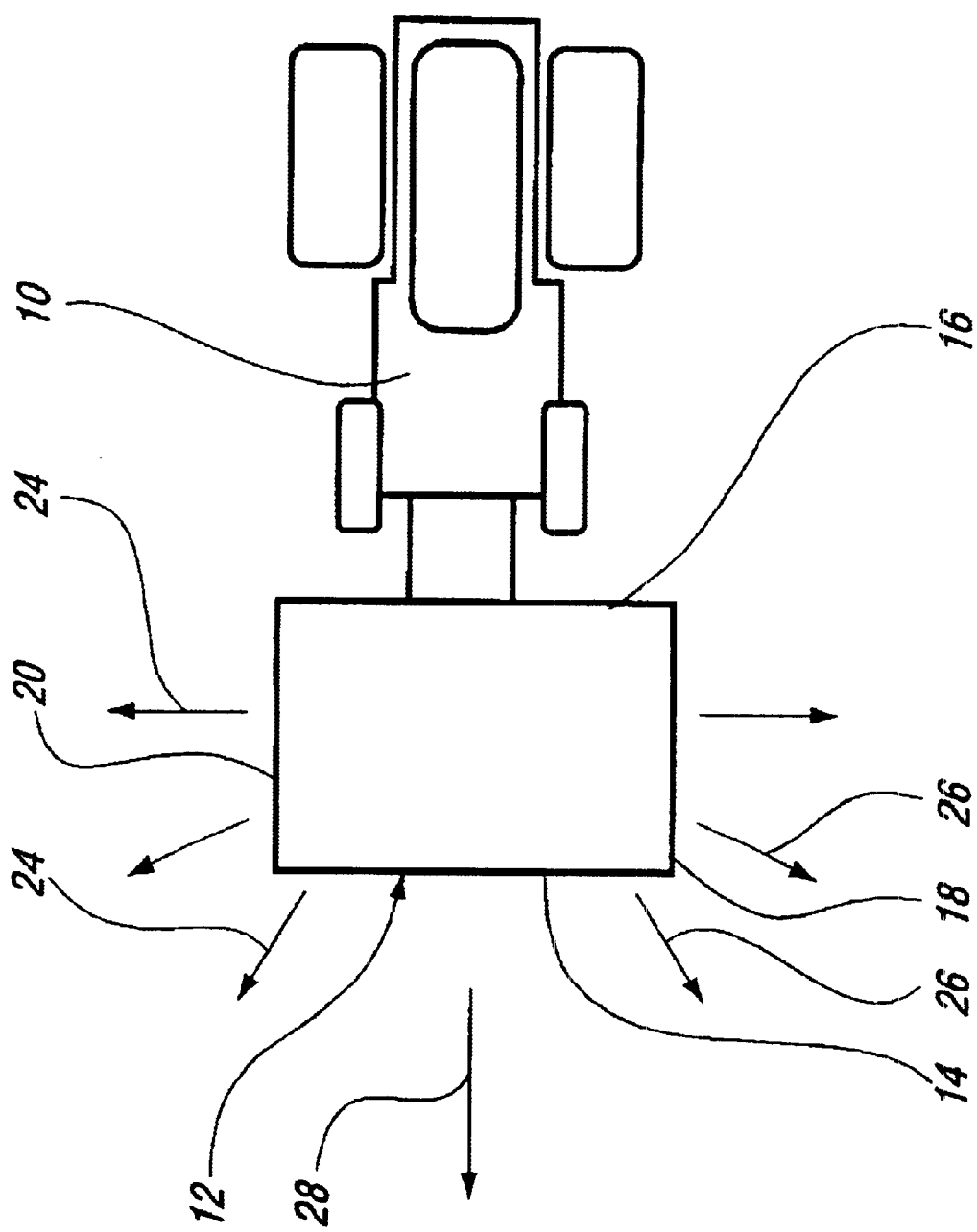
FIG. 1 is a plan showing the machine mounted on a tractor and in operation.

Referring to the drawings, in FIGS. 1 to 3, 10 represents a tractor, on the front of which is mounted a machine according to the embodiment. The machine comprises a hopper 12, which has sides, 14, 16, ends 18, 20, and base 22.

The hopper sides 14, 16 slope towards each other in a downwards direction, and under the hopper are two spinners, to be described in slightly more detail later, which rotate about upright axes and by which the bedding material placed in the hopper can be spread over the ground by being propelled horizontally from under the ends 18, 20 as shown by the arrows 24, 26 in FIG. 1 to layer the bedding material over the area to be layered. Depending upon the speed at which the machine parts are driven, so the greater or lesser will be the extent of throw of the material.

As the propelling of the material from the machine takes place, the tractor is driven in the direction of arrow 28 or in the reverse direction if appropriate, and so a large area is covered. The area may be for example a loose yard.

Figure 2:
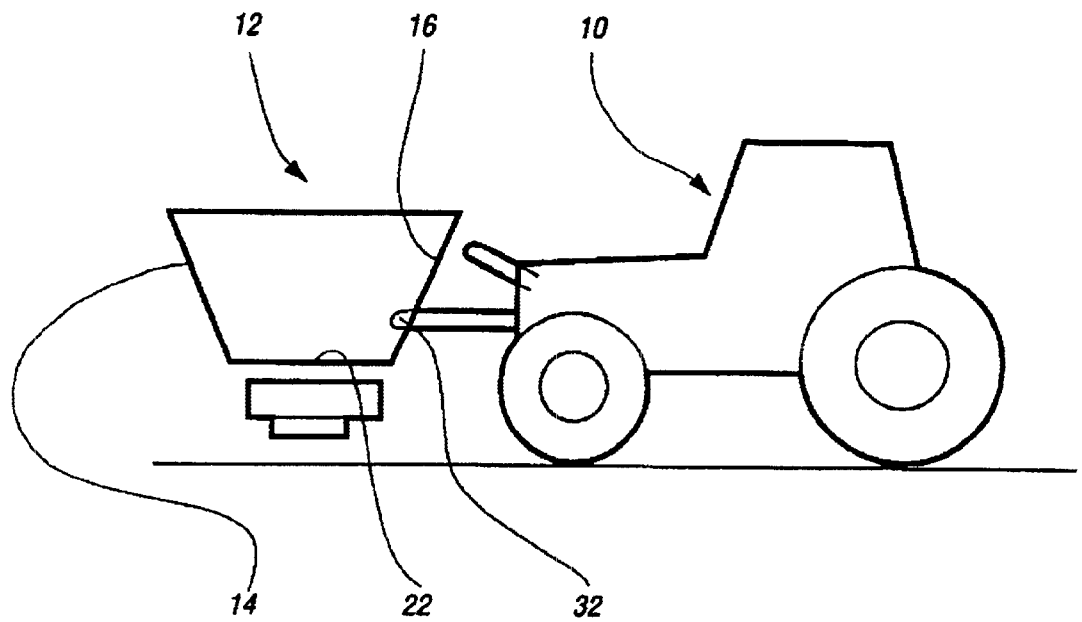
FIG. 2 is a side view of the arrangement shown in FIG. 1.
Figure 3:
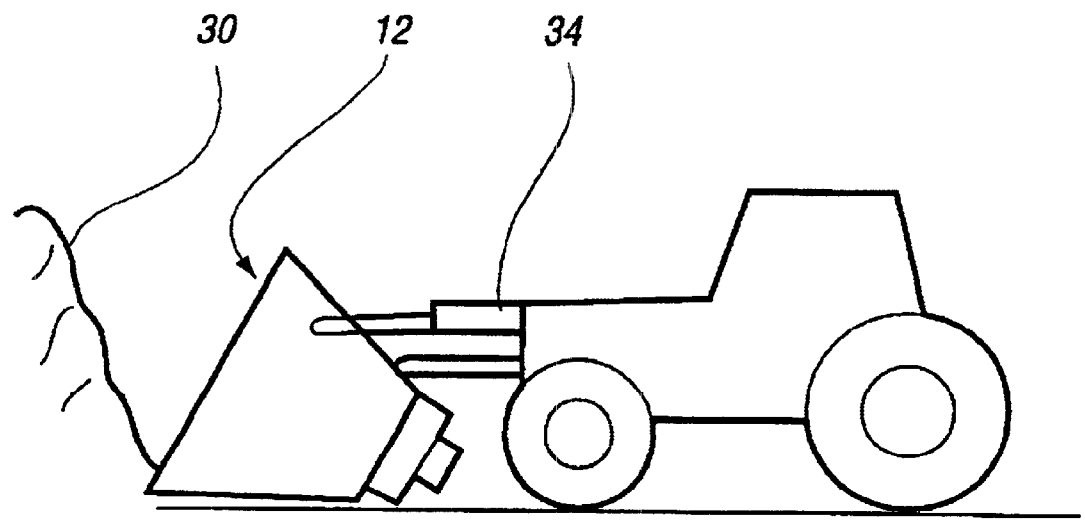
FIG. 3 is a side view similar to FIG. 2, but showing the machine in the tilted or scooping position.

FIG. 2 shows the arrangement of FIG. 1 in side view, to show the shape of the end of the hopper. The hopper is mounted on the tractor so that it can be tipped to the collecting position shown in FIG. 3 in which the side 14 is parallel or almost parallel to the ground. In this position, the hopper is tipped forward so that its open end can be used, by driving the tractor forward, to scoop up bulk bedding material 30 to be spread. The tipping takes place about trunnions 32, and the tipping is by means of a selectively operable hydraulic ram 34 controlled from the tractor cabin.

When the hopper has scooped up a quantity of the material 30, the hopper is righted, to the position shown in FIG. 2, and the machine is ready for spreading as shown in FIG. 1.

Figure 4:
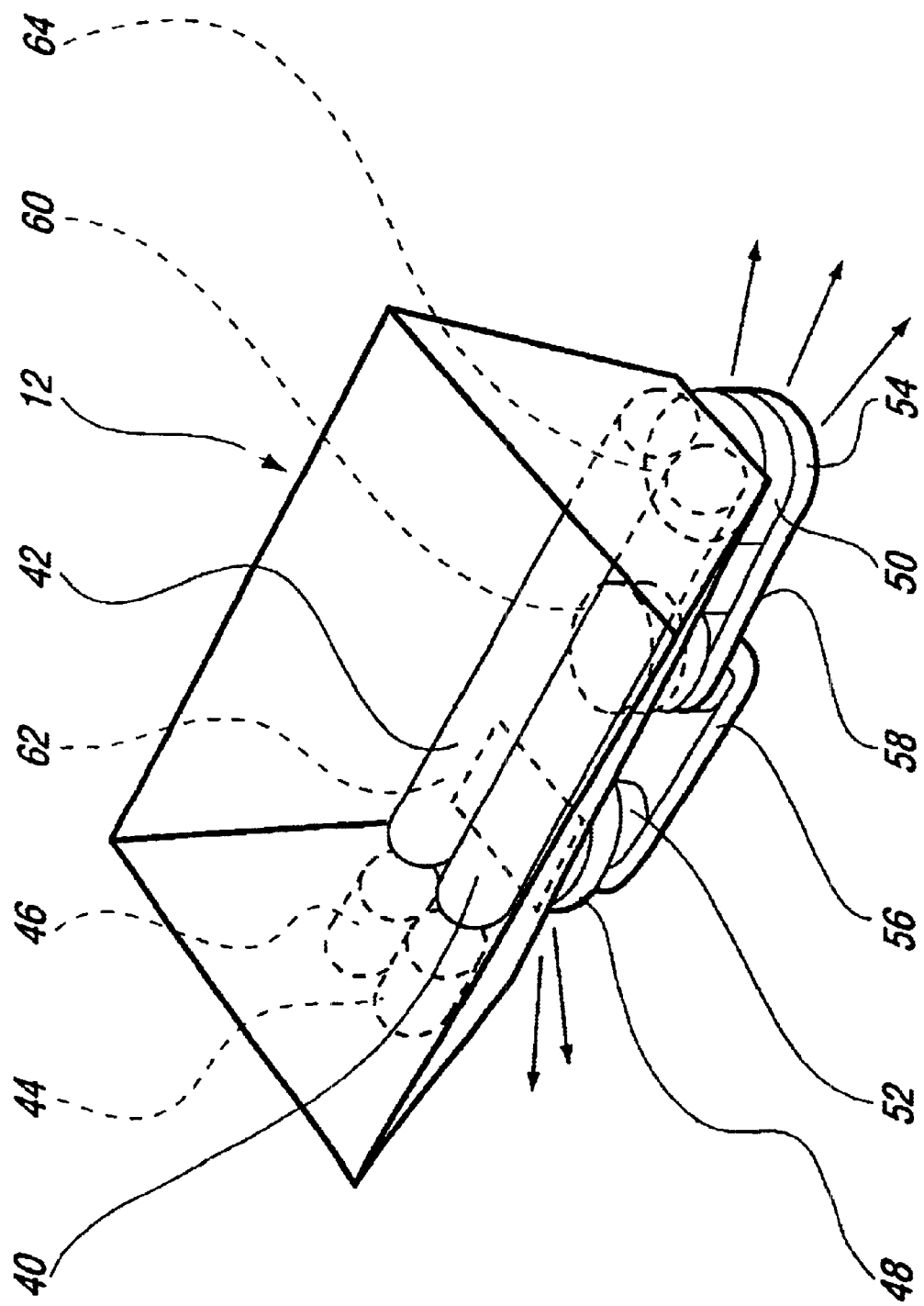
FIG. 4 is a perspective view of the machine, but detached from the tractor and with some parts not shown to illustrate significant parts.

FIG. 4 shows significant parts of the machine. The hopper 12 is clearly shown, and in the hopper extending along the base, are two augers 40, 42 which are of opposite hand. In use the augers are driven by two hydraulic motors 44, 46 mounted on end 20. Under the base are the two spinners 48, 50 which are spinner discs having throwing vanes or blades. The spinners are arranged with their axes vertical when the machine is in use. Each spinner has a shaft on which is mounted a pulley 52, 54 around which is trained a V belt 56, 58 and the two belts 56, 58 are driven by means of centrally located hydraulic motor 60 positioned under the base of the hopper and of which the shaft carries two pulleys or a double V belt pulley around which the belts 56, 58 are trained. The spinners are arranged to be contra rotating, and so in fact one of the V belts may have to be twisted to give the contra rotation. The motors are driven in series. The spinners will normally rotate simultaneously, but by means of an isolating clutch, the spinners may be arranged to rotate in the alternative one at a time, where material is to be spread on one side only.

Figure 5:
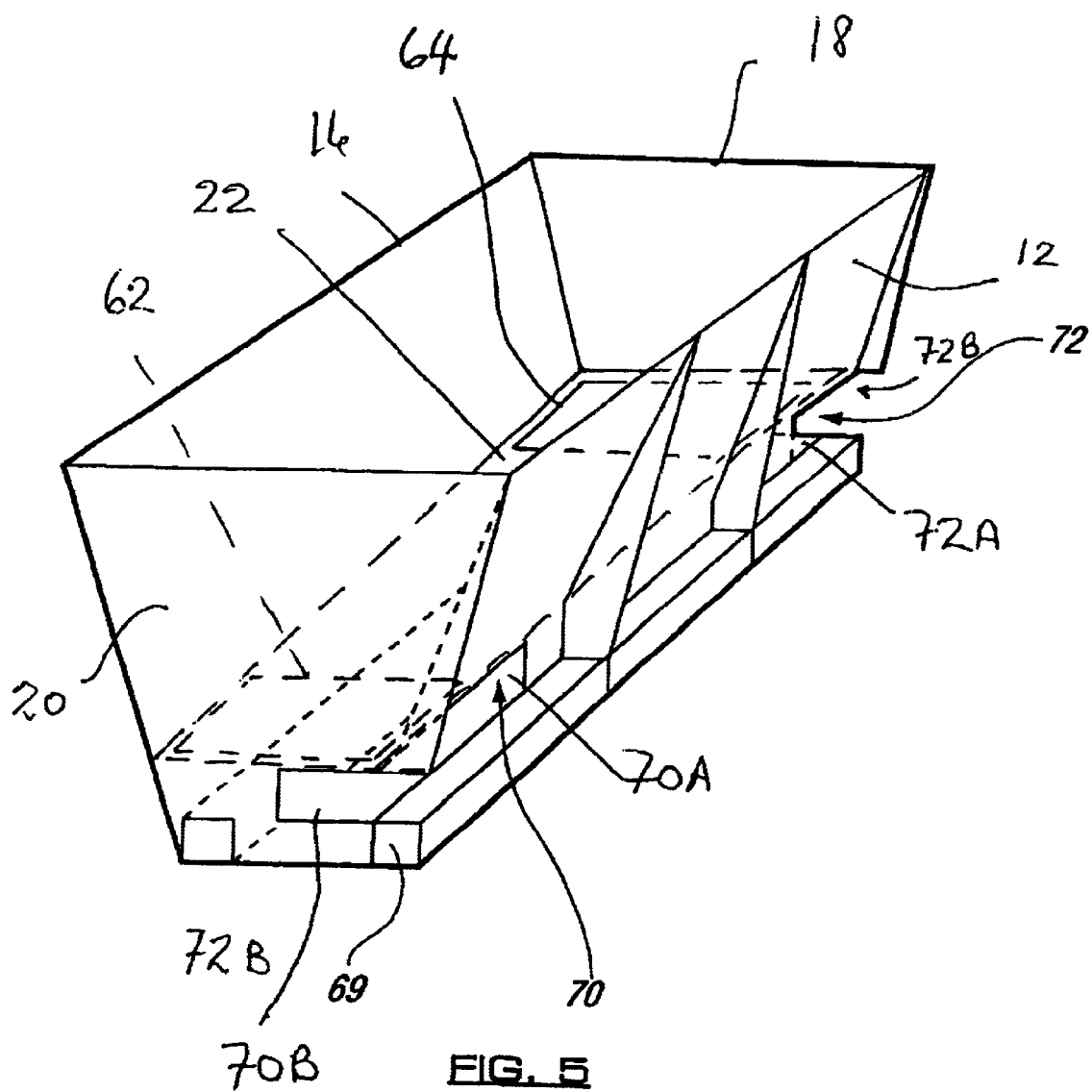
FIG. 5 is a perspective view similar to FIG. 4, but showing a more structural arrangement for the machine.

FIG. 5 shows a more structural embodiment of the machine from which the sides and ends extend upwardly, and it will be seen that it has a chassis 69 (as would be understood) and that there are corner "L"-shaped discharge apertures 70, 72 each having a front section 70A, 72A and side sections 70B, 72B through which the material will be thrown. As will be understood from the foregoing and the drawings, the base 22 is located above the chassis 69, and the "L"-shaped discharge apertures 70, 72 are in the ends and front of the hopper between the chassis 69 and base 22. It is seen that the "L"-shaped discharge apertures 70, 72 extend along the front and ends of the hopper. This has the effect that the material is in use thrown also forward as well as to the sides of the tractor, giving good coverage to the area to be layered.

The length direction of the hopper can be considered to be the direction in which the augers extend, and at or towards the ends, and in the base, are provided discharge apertures 62, 64 through which the bedding material drops and falls onto the spinners. As a result, the bedding material is spread as shown in FIG. 1. The apertures 62, 64 can be controlled as to their size by means of adjustable closure plates and/or apertures therein, thereby providing control of the amount of bedding material discharged. The amount of bedding material discharged is under other controls, such as the speed of the augers, and the speed of the spinners all of which can be adjusted. All controls and stop and start modes are operated from the cabin of the tractor.

The machine provides a quick and efficient means of spreading bedding materials over large areas.

The hydraulic supply for the motors and hydraulic rams of the machine is derived from the prime mover of the tractor.

The spinners may typically rotate at speeds in the order of 600 rpm or more and material can typically be thrown some 15 to 40 feet.

Now that the invention has been described,

What is claimed is:

1. A machine for spreading bedding material, comprising a hopper for receiving a bulk supply of the material, said hopper comprising front and rear sides, ends, a base and a chassis from which the sides and ends extend upwardly, said base being located above the chassis, conveying means in the hopper for displacing the bulk supply in the hopper towards the ends, "L"-shaped discharge apertures in the base and located towards or at the ends, whereby material displaced by the conveying means falls through the "L"-shaped discharge apertures, and including two distribution spinners which are adapted to be driven and are located to receive the material which falls through the respective "L"-shaped discharge apertures, and to propel it away from the respective hopper ends onto the area to be layered, and wherein the "L"-shaped discharge apertures are located between the chassis and base, and extend along the front and ends of the hopper, whereby the material in use is thrown forward as well as to the sides of the hopper.

2. A machine according to claim 1, wherein the spinners rotate in opposite directions relative to one another.

3. A machine according to claim 1, wherein the spinners rotate in a common direction.

4. A machine according to claim 1, wherein the spinners are driven by belt drives.

5. A machine according to claim 4, wherein two pulleys on a spindle shaft of a motor adapted to drive the spinners are respectively engaged by two belts, and the belts are respectively drivingly connected to pulleys on respective drive shafts.

6. A machine according to claim 1, wherein the spinners have suitable throwing vanes to propel the material over the areas to be layered.

7. A machine according to claim 1, wherein the machine is adapted to be carried on a tractor.

8. A machine according to claim 7, wherein the hopper is mounted on the tractor and is movable between a collecting position, in which the hopper is tilted and has utility as a loader bucket to pick up the bulk supply of the material pushing the hopper in said collecting position into the bulk supply, and an upright in use position.

9. A machine according to claim 1, wherein the "L"-shaped discharge apertures in the base are associated with closure/control plates that control the degree of opening and closing of the "L"-shaped discharge apertures.

10. A machine according to claim 9, wherein the plates are movable manually via a mechanical advantage device.

11. A machine according to claim 9 or 10, wherein the plates have holes therein, the hole sizes in effect being adjustable whereby the flow of the bedding material can be controlled, thus controlling the amount of material dispensed.

12. A machine according to claim 9, wherein the plates are movable by a hydraulic ram.

* * * * *